(12) United States Patent
Shi et al.

(10) Patent No.: US 11,723,114 B2
(45) Date of Patent: Aug. 8, 2023

(54) COMMAND INDICATION METHOD AND APPARATUS AND INFORMATION INTERACTION METHOD AND APPARATUS

(71) Applicant: FUJITSU LIMITED, Kawasaki (JP)

(72) Inventors: Yulong Shi, Beijing (CN); Meiyi Jia, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/377,649

(22) Filed: Jul. 16, 2021

(65) Prior Publication Data
US 2021/0345449 A1    Nov. 4, 2021

Related U.S. Application Data

(63) Continuation of application No. 16/747,274, filed on Jan. 20, 2020, now Pat. No. 11,202,337, which is a
(Continued)

(51) Int. Cl.
*H04W 80/08* (2009.01)
*H04L 1/1607* (2023.01)
(Continued)

(52) U.S. Cl.
CPC .......... *H04W 80/08* (2013.01); *H04L 1/1614* (2013.01); *H04L 1/18* (2013.01); *H04L 1/189* (2013.01);
(Continued)

(58) Field of Classification Search
CPC ... H04W 80/08; H04W 28/065; H04W 76/15; H04W 4/70; H04W 80/02; H04L 1/189;
(Continued)

(56) References Cited

U.S. PATENT DOCUMENTS

| 8,687,508 B2 | 4/2014 | Marinier et al. |
| 9,860,797 B2 | 1/2018 | Basu Mallick et al. |

(Continued)

FOREIGN PATENT DOCUMENTS

| CN | 101529781 A | 9/2009 |
| CN | 101646224 A | 2/2010 |

(Continued)

OTHER PUBLICATIONS

IP.com Translation of CN109150388A, Priority 201710461700.4 CN (Year: 2019).*

(Continued)

*Primary Examiner* — Afshawn M Towfighi
(74) *Attorney, Agent, or Firm* — Myers Wolin, LLC

(57) ABSTRACT

A command indication method and apparatus and information interaction method and apparatus. The command indication method includes: transmitting to a user equipment (UE), a command for activating or deactivating duplication transmission by using a bitmap field, to activate or deactivate duplication transmission of one or more packet data convergence protocol entities or radio bearers in the UE. Hence, activation or deactivation may be performed on the duplication transmission mode of one or more PDCP entities in the user equipment.

12 Claims, 7 Drawing Sheets

Related U.S. Application Data continuation of application No. PCT/CN2017/094869, filed on Jul. 28, 2017.

(51) Int. Cl.
| | |
|---|---|
| *H04W 28/06* | (2009.01) |
| *H04W 76/15* | (2018.01) |
| *H04W 4/70* | (2018.01) |
| *H04L 5/00* | (2006.01) |
| *H04L 1/18* | (2023.01) |
| *H04L 1/1867* | (2023.01) |

(52) U.S. Cl.
CPC .............. *H04L 5/0098* (2013.01); *H04W 4/70* (2018.02); *H04W 28/065* (2013.01); *H04W 76/15* (2018.02)

(58) Field of Classification Search
CPC ....... H04L 1/18; H04L 1/1614; H04L 5/0098; H04L 1/1896
See application file for complete search history.

(56) References Cited

U.S. PATENT DOCUMENTS

| | | | |
|---|---|---|---|
| 2008/0059859 A1 | 3/2008 | Marinier et al. | |
| 2009/0016301 A1 | 1/2009 | Sammour et al. | |
| 2010/0130137 A1 | 5/2010 | Pelletier et al. | |
| 2011/0080891 A1* | 4/2011 | Cai | H04W 36/0033 455/436 |
| 2013/0157712 A1 | 6/2013 | Park et al. | |
| 2014/0153529 A1 | 6/2014 | Marinier et al. | |
| 2016/0212661 A1 | 7/2016 | Basu Mallick et al. | |
| 2016/0269146 A1 | 9/2016 | Sun et al. | |
| 2016/0365953 A1 | 12/2016 | Kim et al. | |
| 2017/0142770 A1 | 5/2017 | Fu et al. | |
| 2017/0303170 A1 | 10/2017 | Uchino et al. | |
| 2017/0353914 A1 | 12/2017 | Jung et al. | |
| 2018/0098250 A1 | 4/2018 | Vrzic et al. | |
| 2018/0270718 A1 | 9/2018 | Wang et al. | |
| 2018/0279168 A1* | 9/2018 | Jheng | H04L 5/001 |
| 2018/0310202 A1* | 10/2018 | Löhr | H04W 28/065 |
| 2018/0324641 A1* | 11/2018 | Tsai | H04L 69/322 |
| 2018/0324642 A1* | 11/2018 | Yu | H04L 5/0053 |
| 2018/0368132 A1 | 12/2018 | Babaei et al. | |
| 2019/0098682 A1* | 3/2019 | Park | H04W 28/0257 |
| 2019/0289489 A1 | 9/2019 | Yi et al. | |
| 2020/0382240 A1* | 12/2020 | Centonza | H04W 76/12 |
| 2022/0158785 A1* | 5/2022 | Wang | H04L 1/08 |

FOREIGN PATENT DOCUMENTS

| | | | |
|---|---|---|---|
| CN | 102421138 A | | 4/2012 |
| CN | 103856312 A | | 6/2014 |
| CN | 104980260 A | | 10/2015 |
| CN | 105706482 A | | 6/2016 |
| CN | 106301721 A | | 1/2017 |
| CN | 109150388 | * | 1/2019 |
| EP | 3 133 843 A1 | | 2/2017 |
| JP | 2015-201894 A | | 11/2015 |
| JP | 2016-531506 A | | 10/2016 |
| JP | 2017-513371 A | | 5/2017 |
| KR | 10-2017-0043009 A | | 4/2017 |
| WO | 2008/114198 A2 | | 9/2008 |
| WO | 2015/062557 A1 | | 5/2015 |
| WO | 2016/021661 A1 | | 2/2016 |

OTHER PUBLICATIONS

OPPO, "The impact of duplication on MAC", Agenda Item: 10.3.1.11, 3GPP TSG-RAN WG2 Meeting #NR_AdHoc#2, R2-1706344, Qingdao, China, Jun. 27-29, 2017.
Vice-Chairwoman, Interdigital, "Report from NR User Plane Break-Out Session", Agenda Item: 11.1.1, 3GPP TSG-RAN WG2 Meeting #NR Ad Hoc, R2-1707500, Qingdao, China, Jun. 27-29, 2017.
Nokia et al., "Duplication impacts to MAC", Agenda Item: 10.3.1.8, 3GPP TSG-RAN WG2 Meeting #97bis, R2-1702639, Spokane, USA, Apr. 3-7, 2017.
Huawei, "Email discussion summary on control of UL PDCP duplication", Agenda Item: 10.2.2, 3GPP TSG-RAN2 Meeting #98, R2-1704834, Hangzhou, China, May 15-19, 2017.
LG Electronics, Inc., "Configurability of packet duplication in PDCP", Agenda Item: 10.2.3.1, 3GPP TSG-RAN WG2 Meeting #97bis, R2-1703509 (revision of R2-1701462), Spokane, USA, Apr. 3-7, 2017.
ZTE, "Consideration on the activation/deactivation of data duplication for CA", Agenda Item: 10.2.2, 3GPP TSG-RAN WG2 Meeting #98, R2-1704660, Hangzhou, China, May 15-19, 2017.
International Search Report and Written Opinion of the International Searching Authority issued by the State Intellectual Property Office of the P.R. China for corresponding International Patent Application No. PCT/CN2017/094869, dated Apr. 20, 2018, with an English translation.
International Search Report issued by the State Intellectual Property Office of the P.R. China for corresponding International Patent Application No. PCT/CN2017/096898, dated Dec. 19, 2017, with an English translation.
Written Opinion of the International Searching Authority issued by the State Intellectual Property Office of the P.R. China for corresponding International Patent Application No. PCT/CN2017/096898, dated Dec. 19, 2017, with an English translation.
Non-Final Office Action issued by the United States Patent and Trademark Office for corresponding U.S. Appl. No. 16/356,636, dated Jul. 17, 2019.
Final Office Action issued by the United States Patent and Trademark Office for corresponding U.S. Appl. No. 16/356,636, dated Jan. 17, 2020.
Provisional Application filed in the United States Patent and Trademark Office for U.S. Appl. No. 62/520,251, dated Jun. 15, 2017.
International Search Report issued by the State Intellectual Property Office of the P.R. China for corresponding International Patent Application No. PCT/CN2017/094869, dated Apr. 20, 2018, with an English translation.
Non-Final Office Action issued by the United States Patent and Trademark Office for corresponding U.S. Appl. No. 16/356,636, dated Aug. 12, 2020.
Non-Final Office Action issued by the United States Patent and Trademark Office for corresponding U.S. Appl. No. 16/747,274, dated Jan. 15, 2021.
Notice of Reasons for Refusal issued by the Japan Patent Office for corresponding Japanese Patent Application No. 2020-502418, dated Feb. 2, 2021, with a full English translation.
Notification of Reasons for Refusal issued by the Japan Patent Office for corresponding Japanese Patent Application No. 2020-502128, dated Feb. 16, 2021, with a full English translation.
Extended European search report with supplementary European search report and the European search opinion issued by the European Patent Office for corresponding European Patent Application No. 17919076.4-1205, dated Feb. 10, 2021.
Final Office Action issued by the United States Patent and Trademark Office for corresponding U.S. Appl. No. 16/356,636, dated Feb. 22, 2021.
Provisional Application filed in the United States Patent and Trademark Office for U.S. Appl. No. 62/469,708, filed Mar. 10, 2017.
Final Office Action issued by the United States Patent and Trademark Office for corresponding U.S. Appl. No. 16/747,274 dated Apr. 30, 2021.
Notice of Reasons for Refusal issued by the Japan Patent Office for corresponding Japanese Patent Application No. 2021-069627, dated Jun. 7, 2022, with an English translation.
Non-Final Office Action issued by the United States Patent and Trademark Office for corresponding U.S. Appl. No. 16/356,636, dated Jun. 22, 2021.
First Notification of Office Action and Search Report issued by the China National Intellectual Property Administration for corresponding Chinese Patent Application No. 201780092345.6, dated Oct. 11, 2021, with an English translation.

(56) References Cited

OTHER PUBLICATIONS

First Notification of Office Action and Search Report issued by the China National Intellectual Property Administration or corresponding Chinese Patent Application No. 201780091949.9, dated Oct. 26, 2021, with an English translation.

* cited by examiner

COMMAND INDICATION METHOD AND APPARATUS AND INFORMATION INTERACTION METHOD AND APPARATUS

CROSS REFERENCE TO RELATED APPLICATIONS

This application is a continuation application of U.S. application Ser. No. 16/747,274 filed on Jan. 20, 2020, which is a continuation application of International Application No. PCT/CN2017/094869, filed on Jul. 28, 2017, the contents of which are herein incorporated by reference.

TECHNICAL FIELD

This disclosure relates to the field of communication technologies, and in particular to a command indication method and apparatus and an information interaction method and apparatus.

BACKGROUND

Issues related to next-generation wireless communication systems are under study in the 3rd Generation Partnership Project (3GPP). In order to support high-reliability data transmission, in a next-generation system, duplication transmission of packet data convergence protocol (PDCP) data in a plurality of links will be supported. Use of diversity gains of identical PDCP protocol data units (PDUs) transmitted in a plurality of different links may lower a probability of error of transmission of the PDCP PDUs and ensure reliability of services.

Resource utilization of duplication transmission of PDCP PDUs is only half of that of split transmission of PDCP PDUs (i.e. transmission of different PDCP PDUs in different links). Duplication transmission of PDCP PDUs sacrifices a lot of radio resources to improve the reliability of data transmission.

Therefore, when a quality of a radio link is good and the split transmission can meet the reliability of data transmission, duplication transmission needs to be deactivated and split transmission is used. When the quality of the radio link deteriorates, in order to ensure the reliability of data transmission, duplication transmission needs to be activated.

On the other hand, a network device will configure the PDCP PDU data transmission mode of a user equipment (UE) according to the current radio link quality and service requirements, that is, activate or deactivate duplication transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when a user equipment is connected to a plurality of network devices (such as base stations) at the same time to perform multi-connection transmission, each network device may individually activate or deactivate the duplication transmission mode of the user equipment. However, there is currently no an effective solution for how the network device particularly activates or deactivates duplication transmission of one or more PDCP entities in the user equipment. Furthermore, there exists a problem that configurations of the duplication transmission mode at a network device side and a user equipment side do not match, and there is currently no an effective solution.

Embodiments of this disclosure provide a command indication method and apparatus and an information interaction method and apparatus, in which by transmitting a command for activating or deactivating duplication transmission by a network device to a user equipment by using a bitmap field, duplication transmission of one or more PDCP entities in the UE may be activated or deactivated; and by transmitting a configuration request message and/or configuration notification message in a plurality of network devices for notifying whether one or more PDCP entities in a user equipment activate(s) a duplication transmission mode, understanding of the configuration of the duplication transmission by the plurality of network devices to which the user equipment is connected may be ensured to be consistent.

According to a first aspect of the embodiments of this disclosure, there is provided a command indication method, including:

transmitting to a user equipment (UE), a command for activating or deactivating duplication transmission by using a bitmap field, to activate or deactivate duplication transmission of one or more packet data convergence protocol entities or radio bearers in the UE.

According to a second aspect of the embodiments of this disclosure, there is provided a command indication apparatus, including:

a command transmitting unit configured to transmit to a user equipment (UE), a command for activating or deactivating duplication transmission by using a bitmap field, to activate or deactivate duplication transmission of one or more packet data convergence protocol entities or radio bearers in the UE.

According to a third aspect of the embodiments of this disclosure, there is provided a command receiving method, including:

receiving, by a user equipment, a command used for activating or deactivating duplication transmission transmitted by a network device via a bitmap field; and activating or deactivating duplication transmission of one or more packet data convergence protocol entities or radio bearers by the UE according to the bitmap field.

According to a fourth aspect of the embodiments of this disclosure, there is provided a command receiving apparatus, including:

a command receiving unit configured to receive a command used for activating or deactivating duplication transmission transmitted by a network device via a bitmap field; and a transmission processing unit configured to activate or deactivate duplication transmission of one or more packet data convergence protocol entities or radio bearers according to the bitmap field.

According to a fifth aspect of the embodiments of this disclosure, there is provided an information interaction method, including:

receiving, by a network device, duplication transmission configuration request message(s) transmitted by one or more other network devices, the duplication transmission configuration request message(s) being configured to indicate whether one or more packet data convergence protocol entities or radio bearers in a user equipment (UE) need(s) to activate a duplication transmission mode.

According to a sixth aspect of the embodiments of this disclosure, there is provided an information interaction apparatus, including:

a request receiving unit configured to receive duplication transmission configuration request message(s) transmitted by one or more network devices, the duplication transmission configuration request message(s) being used to indicate whether one or more packet data convergence protocol entities or radio bearers in a user equipment (UE) need(s) to activate a duplication transmission mode.

According to a seventh aspect of the embodiments of this disclosure, there is provided an information interaction method, including:

transmitting duplication transmission configuration notification message(s) by a network device to one or more other network devices, for notifying the one or more network devices of whether one or more packet data convergence protocol entities or radio bearers in a user equipment (UE) activate(s) a duplication transmission mode.

According to an eighth aspect of the embodiments of this disclosure, there is provided an information interaction apparatus, including:

a message transmitting unit configured to transmit duplication transmission configuration notification message(s) to one or more network devices, for notifying the one or more network devices of whether one or more packet data convergence protocol entities or radio bearers in a user equipment (UE) activate(s) a duplication transmission mode.

According to a ninth aspect of the embodiments of this disclosure, there is provided a communication system, including:

a first network device including the information interaction apparatus as described in the sixth aspect, or the information interaction apparatus as described in the eighth aspect;

a second network device including the command indication apparatus as described in the second aspect, or the information interaction apparatus as described in the sixth aspect, or the information interaction apparatus as described in the eighth aspect; and a user equipment including the command receiving apparatus as described in the fourth aspect.

An advantage of the embodiments of this disclosure exists in that by transmitting a command for activating or deactivating duplication transmission by a network device to a user equipment by using a bitmap field, duplication transmission of one or more PDCP entities in the UE may be activated or deactivated;

and by transmitting a configuration request message or configuration notification message in a plurality of network devices for notifying whether one or more PDCP entities in a user equipment activate(s) a duplication transmission mode, understanding of the configuration of the duplication transmission by the plurality of network devices to which the user equipment is connected may be ensured to be consistent.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
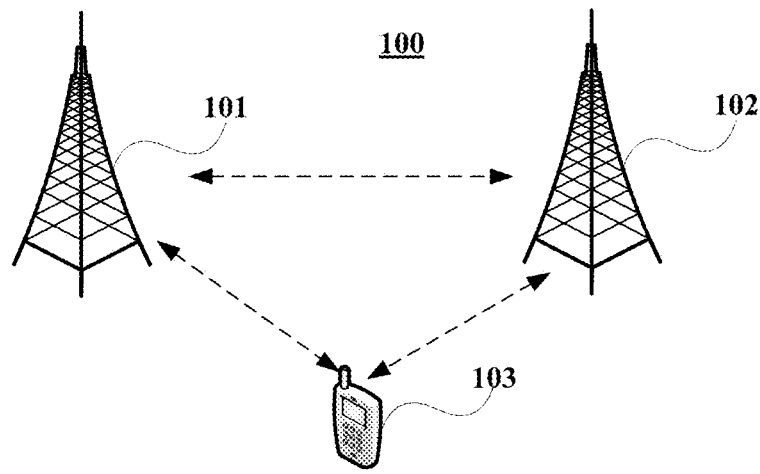
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101, a network device 102 and a user equipment 103. For the sake of simplicity, description is given in FIG. 1 by taking one user equipment and two network devices only as an example; however, the embodiments of this disclosure are not limited thereto.

In the embodiment of this disclosure, existing traffics or traffics that may be implemented in the future may be performed between the network device 101 or 102 and the user equipment 103. For example, such traffics may include but not limited to an enhanced mobile broadband (eMBB), massive machine type communication (MTC), and ultra-reliable and low-latency communication (URLLC).

In the embodiments of this disclosure, the user equipment may be connected to a plurality of network devices simultaneously for multi-connection transmission. Since the plurality of network devices may configure a duplication transmission mode of the same user equipment, it is possible that a certain network device is unable to know whether a current duplication transmission mode of the user equipment is activated or deactivated by other network devices. This will result in mismatched configurations of the duplication transmission mode at the network device side and the user equipment side. Therefore, the network device side is needed to perform information interaction between the plurality of network devices to ensure that the plurality of network devices to which the user equipment is connected have a consistent understanding of their configurations of duplication transmission mode.

Furthermore, when a plurality of PDCP entities of the user equipment perform duplication transmissions, a certain network device may activate or deactivate only a part of the PDCP entities, and it is not necessary to configure other PDCP entities. At this case, a new activation command format needs to be designed so as to support activation or deactivation of some PDCP entities of the user equipment without changing transmission states of other PDCP entities.

It should be noted that the embodiments of this disclosure are described by taking that the user equipment is connected to two or more network devices at the same time as an example. However, this disclosure is not limited thereto; for example, the methods or apparatuses may also be applicable to scenarios where a user equipment is not connected to two or more network devices at the same time.

Embodiment 1

The embodiments of this disclosure provide a command indication method, applicable to a user equipment and one of a plurality of network devices; the UE is connected to the plurality of network devices at the same time.

Figure 2:
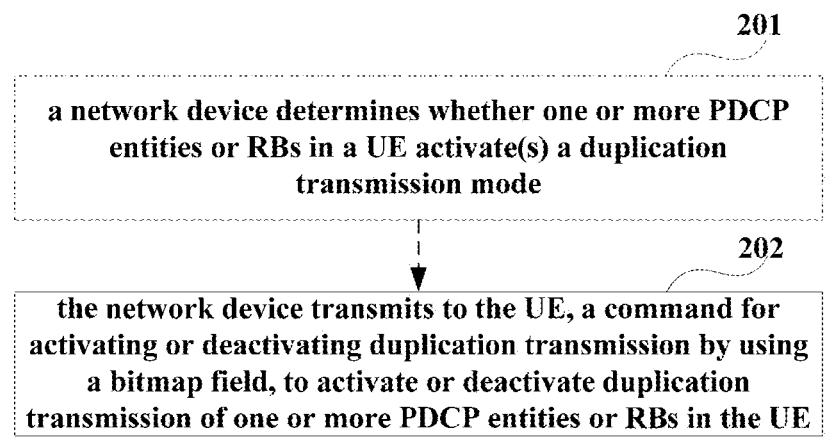
FIG. 2 is a schematic diagram of the command indication method of Embodiment 1 of this disclosure.

FIG. 2 is a schematic diagram of the command indication method of the embodiment of this disclosure, which shall be described from a network device side. As shown in FIG. 2, the command indication method includes:

202: a network device transmits to a user equipment, a command for activating or deactivating duplication transmission by using a bitmap field, to activate or deactivate duplication transmission of one or more PDCP entities or radio bearers in the UE.

In an embodiment, a bit in the bitmap field may correspond to a PDCP entity or a radio bearer (RB), or a plurality of bits in the bitmap field (such as two or a pair; however, this disclosure is not limited thereto, and they may also be more than two bits) may correspond to one PDCP entity or RB.

In an embodiment, the radio bearer (RB) may include a data radio bearer (DRB) and/or a signaling radio bearer (SRB); however, this disclosure is not limited thereto, and following description shall be given by taking a DRB as an example. Furthermore, reference may be made to related techniques for particular contents of the PDCP and RB.

In one embodiment, an i-th bit or an i-th pair of bits in the bitmap field may correspond to a PDCP entity of a DRB identity being i.

For example, a user equipment may support 32 PDCP entities (however, this disclosure is not limited thereto, and they may also be of other numbers), and their corresponding DRB identities are denoted by 0 to 31; thus, the bitmap field may include 32 bits, respectively corresponding to these 32 PDCP entities.

For another example, a user equipment may support 32 PDCP entities (however, this disclosure is not limited thereto, and they may also be of other numbers), and their corresponding DRB identities are denoted by 0 to 31; thus, the bitmap field may include 32 pairs of bits (i.e. 64 bits), respectively corresponding to these 32 PDCP entities.

In another embodiment, an i-th bit or an i-th pair of bits in the bitmap field may correspond to a packet data convergence protocol entity of a duplication transmission identity being i. The duplication transmission identity may be configured by the network device side, and may be independent of the DRB identity.

For example, a user equipment may support 32 PDCP entities (however, this disclosure is not limited thereto, and they may also be of other numbers), and their corresponding duplication transmission identities are denoted by 0 to 31; thus, the bitmap field may include 32 bits, respectively corresponding to these 32 PDCP entities.

For another example, a user equipment may support 32 PDCP entities (however, this disclosure is not limited thereto, and they may also be of other numbers), and their corresponding duplication transmission identities are denoted by 0 to 31; thus, the bitmap field may include 32 pairs of bits (i.e. 64 bits), respectively corresponding to these 32 PDCP entities.

In a further embodiment, an i-th bit or an i-th pair of bits in the bitmap field may correspond to an i-th PDCP entity in ranked PDCP entities in the UE that are configured as duplication transmission.

For example, a user equipment may support 32 PDCP entities (however, this disclosure is not limited thereto, and they may also be of other numbers), in which, for example, 8 PDCP entities may be successively configured by the network device as using a duplication transmission mode (that is, duplication transmission is activated); and the 8 PDCP entities configured as duplication transmission may be ranked.

In an example, the PDCP entities that are configured as duplication transmission may be ranked in a sequential order of configuring duplication transmission by a network device, or, in another example, they may be ranked in a sequential order of DRB identities to which the PDCP entities correspond. It should be noted that how to rank the PDCP entities configured as duplication transmission is illustrated above. However, this disclosure is not limited thereto, and other suitable ranking methods may also be adopted.

For example, a PDCP entity configured as duplication transmission may be denoted by 0 to 7 after being ranked, and the bitmap field may include 8 bits, respectively corresponding to the 8 PDCP entities configured as duplication transmission. Alternatively, the bitmap field may include 8 pairs of bits (that is, 16 bits), respectively corresponding to the 8 PDCP entities configured as duplication transmission.

In an embodiment, a value of one bit or a plurality of bits (such as two or a pair) in the bitmap field may be used to instruct to change a transmission state of the corresponding PDCP entity, and another value may be used to instruct to maintain a transmission state of the corresponding PDCP entity.

For example, the bit "1" may be used to indicate that the user equipment changes the transmission state of the corresponding PDCP entity. That is, if the original transmission state of the PDCP entity is an activated state of duplication transmission, it instructs that the user equipment should change the transmission state of the PDCP entity into a deactivated state of duplication transmission; and if the original transmission state of the PDCP entity is a deactivated state of duplication transmission, it instructs that the user equipment should change the transmission state of the PDCP entity into an activated state of duplication transmission. The bit "0" may be used to instruct the user equipment to maintain a current transmission state of the PDCP entity, and change of activation or deactivation state is not needed.

For another example, the bit "0" may be used to instruct the user equipment to change a transmission state of the corresponding PDCP entity. That is, if the original transmission state of the PDCP entity is an activated state of duplication transmission, it instruct that the user equipment should change the transmission state of the PDCP entity into a deactivated state of duplication transmission; if the original transmission state of the PDCP entity is a deactivated state of duplication transmission, it instructs that the user equipment should change the transmission state of the PDCP entity into an activated state of duplication transmission. The bit "1" may be used to instruct the user equipment to maintain a current transmission state of the PDCP entity, and change of activation or deactivation state is not needed.

For example, the bits "11" may be used to instruct the user equipment to change a transmission status of the corresponding PDCP entity. That is, if the original transmission state of the PDCP entity is an activated state of duplication transmission, it instructs that the user equipment should change the transmission state of the PDCP entity into a deactivated state of duplication transmission; and if the original transmission state of the PDCP entity is a deactivated state of duplication transmission, instructs that the user equipment should change the transmission state of the PDCP entity into an activated state of duplication transmission. The bits "00" may be used to instruct the user equipment to maintain a current transmission state of the PDCP entity, and change of the activation or deactivation state is not needed.

For example, the bits "00" may be used to instruct the user equipment to change a transmission status of the corresponding PDCP entity, that is, if the original transmission state of the PDCP entity is an activated state of duplication transmission, it instructs that the user equipment should change the transmission state of the PDCP entity into a deactivated state of duplication transmission; and if the original transmission state of the PDCP entity is a deactivated state of duplication transmission, it instructs that the user equipment should change the transmission state of the PDCP entity into an activated state of duplication transmission. The bits "11" may be used to instruct the user equipment to maintain a current transmission state of the PDCP entity, and change of the activation or deactivation state is not needed.

For another example, "11" is used to instruct to activate duplication transmission of the PDCP entity, and the PDCP entity performs duplication transmission in a plurality of links at the same time; "00" is used to instruct to deactivate duplication transmission of the PDCP entity, and the PDCP entity performs split transmission in a plurality of links at the same time; "10" is used to instruct to deactivate duplication transmission of the PDCP entity, and the PDCP entity performs single-link transmission on a first RLC entity; and "01" is used to instruct to deactivate duplication transmission of the PDCP entity, and the PDCP entity performs single-link transmission on a second RLC entity.

It should be noted that how to change or maintain the transmission state of the corresponding PDCP entity according to the values of one or more bits is illustrated above; however, this disclosure is not limited thereto. Indicative meanings of the values of one or more bits may be determined as demanded.

In an embodiment, one bit or a plurality of bits in the bitmap field may be used to indicate that the corresponding PDCP entity executes one of the following operations: the duplication transmission of the PDCP entity being activated, and the PDCP entity simultaneously performing duplication transmission in a plurality of links; the duplication transmission of the PDCP entity being deactivated, and the PDCP entity simultaneously performing split transmission in a plurality of links; and the duplication transmission of the PDCP entity being deactivated, and the PDCP entity performing single-link transmission in a designated radio link control (RLC) entity. For example, the single-link transmission may be performed on a first RLC entity, or may be performed on a second RLC entity.

As shown in FIG. 2, the command indication method may further include:

201: the network device determines whether the one or more PDCP entities or RBs in the UE activate(s) a duplication transmission mode (such as activating duplication transmission or deactivating duplication transmission).

In an embodiment, the network device may determine whether the one or more PDCP entities or RBs activate(s) a duplication transmission mode according to radio link quality and/or traffic features of the UE, and/or duplication transmission configuration notification message(s) transmitted by one or more network devices. Reference may be made to Embodiment 2 for the duplication transmission configuration notification message.

Figure 3:
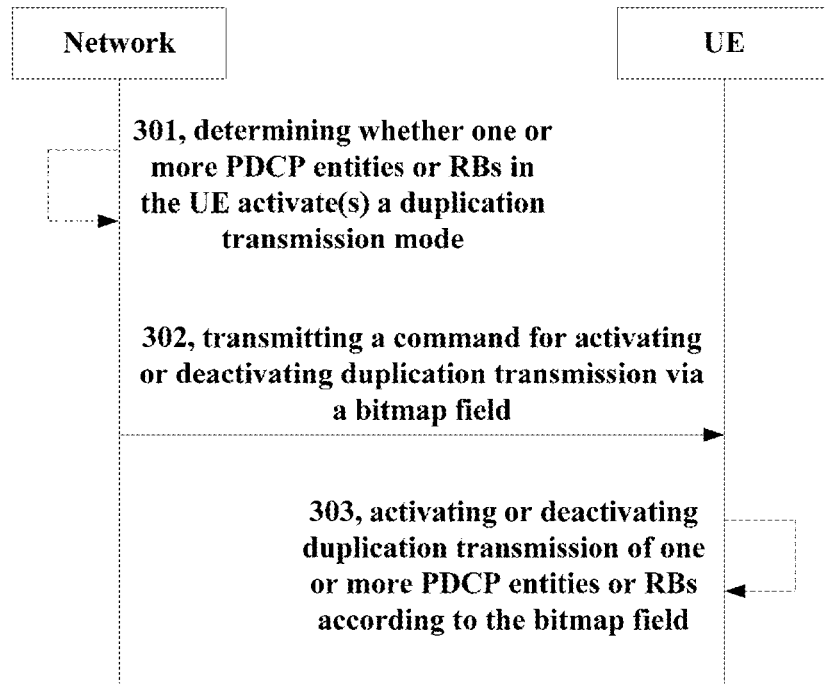
FIG. 3 is another schematic diagram of the command indication method of Embodiment 1 of this disclosure.

FIG. 3 is another schematic diagram of the command indication method of the embodiment of this disclosure, which shall be described from a network device side and a user equipment side. As shown in FIG. 3, the command indication method includes:

301: a network device determines whether one or more PDCP entities or RBs in a user equipment activate(s) a duplication transmission mode;

302: the network device transmits a command for activating or deactivating duplication transmission to the user equipment via a bitmap field; and 303: the user equipment activates or deactivates duplication transmission of one or more PDCP entities or RBs according to the bitmap field after receiving the command.

For example, if a bit to which a PDCP entity or an RB in the command corresponds is "1", the PDCP entity should be changed with respect to its transmission state. That is, if the original transmission state of the PDCP entity is an activated state of duplication transmission, the transmission state of the PDCP entity should be changed into a deactivated state of duplication transmission; and if the original transmission state of the PDCP entity is a deactivated state of duplication transmission, the transmission state of the PDCP entity should be changed into an activated state of duplication transmission. And if a bit to which a PDCP entity or an RB in the command corresponds is "0", the PDCP entity should be maintained at its transmission state.

In an embodiment, after receiving the command for activating or deactivating the duplication transmission, the user equipment may select to execute one of the following according to the instruction of the bitmap field: activating the duplication transmission state of the PDCP entity, and performing duplication transmission simultaneously by the PDCP entity in a plurality of links; deactivating the duplication transmission state of the PDCP entity, and performing split transmission (i.e. a transmission mode in which different PDCP PDUs are transmitted in different links) simultaneously by the PDCP entity in a plurality of links; deactivating the duplication transmission state of the PDCP entity, and performing single-link transmission by the PDCP entity on a first RLC entity; and deactivating the duplication transmission state of the PDCP entity, and performing single-link transmission by the PDCP entity on second RLC entity.

It should be noted that the embodiment of this disclosure is only illustrated in FIG. 3; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 3.

In an embodiment, the network device may further receive a duplication transmission configuration request message transmitted by one or more other network devices, or transmit a duplication transmission configuration request message to one or more other network devices. Reference may be made to Embodiment 2 or 3 for a content of the duplication transmission configuration request message.

In an embodiment, the network device may further receive a duplication transmission configuration notification message transmitted by one or more other network devices, or transmit a duplication transmission configuration notification message to one or more other network devices. Reference may be made to Embodiment 2 or 3 for a content of the duplication transmission configuration notification message.

It can be seen from the above embodiments that by transmitting the command for activating or deactivating duplication transmission by the network device to the user equipment by using the bitmap field, duplication transmission of one or more PDCP entities or RBs in the UE may be activated or deactivated.

Embodiment 2

The embodiments of this disclosure provide an information interaction method, applicable to a plurality of network devices connected to a user equipment at the same time. Following description shall be given by taking a first network device and a second network device as an example. However, this disclosure is not limited thereto, and information interaction may also be performed by more than two network devices.

Figure 4:
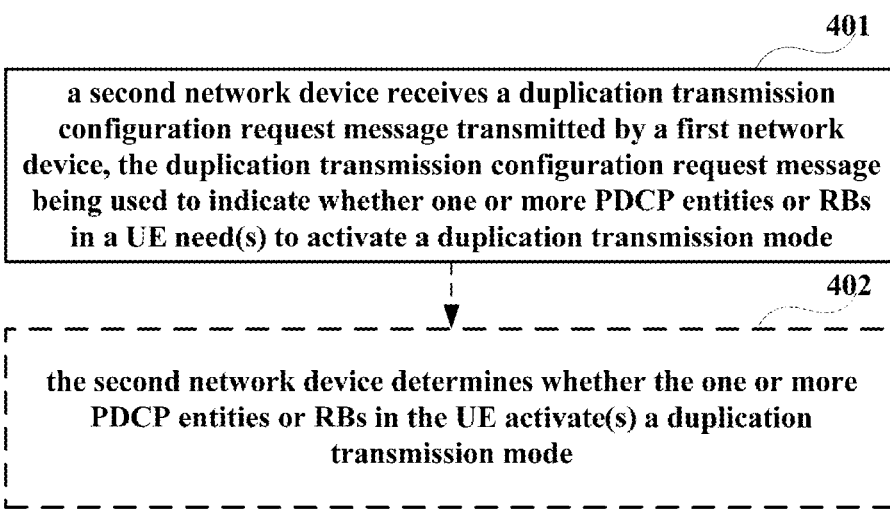
FIG. 4 is a schematic diagram of the information interaction method of Embodiment 2 of this disclosure.

FIG. 4 is a schematic diagram of the information interaction method of the embodiment of this disclosure, which shall be described from a second network device. As shown in FIG. 4, the information interaction method includes:

401: a second network device receives a duplication transmission configuration request message transmitted by a first network device, the duplication transmission configuration request message being used to indicate whether one or more PDCP entities or RBs in a user equipment need(s) to activate a duplication transmission mode.

In an embodiment, the duplication transmission configuration request message may include: an identity of the UE (such as a UE ID), identity/identities of one or more PDCP entities or identity/identities of one or more RBs, and indication information for activating or deactivating duplication transmission of the one or more PDCP entities or RBs. However, this disclosure is not limited thereto, and for example, other information may also be included.

As shown in FIG. 4, the information interaction method may further include:

402: the second network device determines whether the one or more PDCP entities or RBs in the UE activate(s) a duplication transmission mode.

Figure 5:
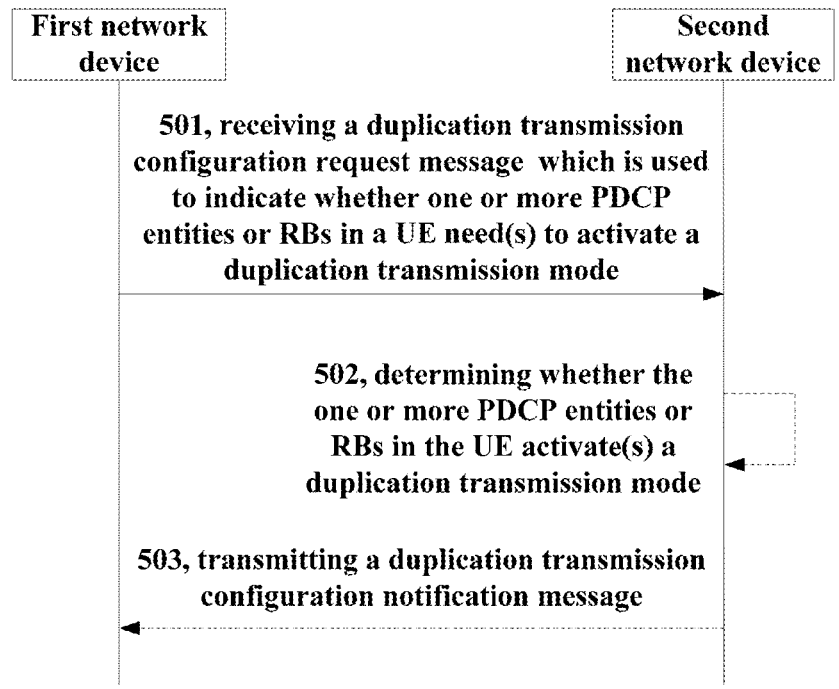
FIG. 5 is another schematic diagram of the information interaction method of Embodiment 2 of this disclosure.

FIG. 5 is another schematic diagram of the information interaction method of the embodiment of this disclosure, which shall be described from a plurality of network devices. As shown in FIG. 5, the information interaction method includes:

501: a second network device receives a duplication transmission configuration request message transmitted by a first network device, the duplication transmission configuration request message being used to indicate whether one or more PDCP entities or RBs in the user equipment need(s) to activate a duplication transmission mode.

As shown in FIG. 5, the information interaction method may further include:

502: the second network device determines whether the one or more PDCP entities or RBs in the UE activate(s) a duplication transmission mode.

For example, the second network device may, according to radio link quality and/or traffic features of the UE, determine whether the one or more PDCP entities or RBs perform(s) configuration of activation or deactivation of duplication transmission.

For another example, the second network device may, according to the duplication transmission configuration request message transmitted by one or more other network devices, determine whether the one or more PDCP entities or RBs perform(s) configuration of activation or deactivation of duplication transmission.

For a further example, the second network device may, according to radio link quality and/or traffic features of the UE and the duplication transmission configuration request message transmitted by one or more other network devices, determine whether the one or more PDCP entities or RBs perform(s) configuration of activation or deactivation of duplication transmission.

In an embodiment, the second network device may transmit the duplication transmission configuration notification message to one or more other network devices. However, this disclosure is not limited thereto; for example, the second network device may also transmit information on duplication transmission configuration to the user equipment, and the user equipment may forward the information on duplication transmission configuration to other network devices. Following description shall be given by taking that interaction is performed between network devices as an example.

As shown in FIG. 5, the information interaction method may further include:

503: the second network device transmits a duplication transmission configuration notification message to one or more network devices, for notifying the one or more network devices of whether the one or more PDCP entities or RBs in the user equipment activate(s) a duplication transmission mode.

For example, after the second network device makes a decision on performing configuration of activation or deactivation of duplication transmission on the one or more PDCP entities in the user equipment, it may transmit notification message for performing configuration of activation or deactivation of duplication transmission, notifying information on the decision it made to the first network device.

In one embodiment, the duplication transmission configuration notification message may include: an identity of the UE (such as a UE ID), identity/identities of one or more PDCP entities or identity/identities of one or more RBs, and indication information for activating or deactivating duplication transmission of the one or more PDCP entities or duplication transmission of the one or more RBs.

In another embodiment, the duplication transmission configuration notification message may include: an identity of the UE (such as a UE ID), and a bitmap field for activating or deactivating duplication transmission of one or more PDCP entities or duplication transmission of one or more RBs. Reference may be made to Embodiment 1 for a content of the bitmap field, and this disclosure is not limited thereto; for example, other information may also be included.

It should be noted that the embodiment of this disclosure is only illustrated in FIG. 5; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

It can be seen from the above embodiments that by transmitting a configuration request message in network devices for indicating whether one or more PDCP entities or RBs in a user equipment need(s) to activate a duplication transmission mode, understanding of the configuration of the duplication transmission by a plurality of network devices may be ensured to be consistent.

Embodiment 3

The embodiments of this disclosure provide an information interaction method, applicable to a plurality of network devices connected to a user equipment at the same time. Following description shall be given by taking a first network device and a second network device as an example. However, this disclosure is not limited thereto, and information interaction may also be performed by more than two network devices.

Figure 6:
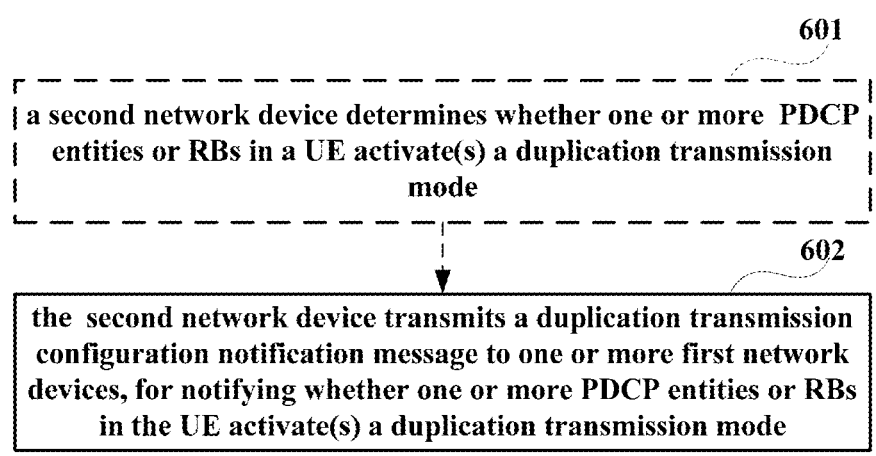
FIG. 6 is a schematic diagram of the information interaction method of Embodiment 3 of this disclosure.

FIG. 6 is a schematic diagram of the information interaction method of the embodiment of this disclosure, which shall be described from a second network device. As shown in FIG. 6, the information interaction method includes:

602: a second network device transmits a duplication transmission configuration notification message to one or more first network devices, for notifying the one or more first network devices of whether one or more PDCP entities or RBs in a user equipment activate(s) a duplication transmission mode.

For example, the duplication transmission configuration notification message may include: an identity of the UE (such as a UE ID), identity/identities of one or more PDCP entities or identity/identities of one or more RBs, and indication information for activating or deactivating duplication transmission of the one or more PDCP entities or duplication transmission of the one or more RBs.

For another example, the duplication transmission configuration notification message may include: an identity of the UE (such as a UE ID), and a bitmap field for activating or deactivating duplication transmission of one or more PDCP entities or duplication transmission of one or more RBs.

As shown in FIG. 6, the information interaction method may further include:

601: the second network device determines whether the PDCP entities or RBs in the UE activate(s) a duplication transmission mode.

Figure 7:
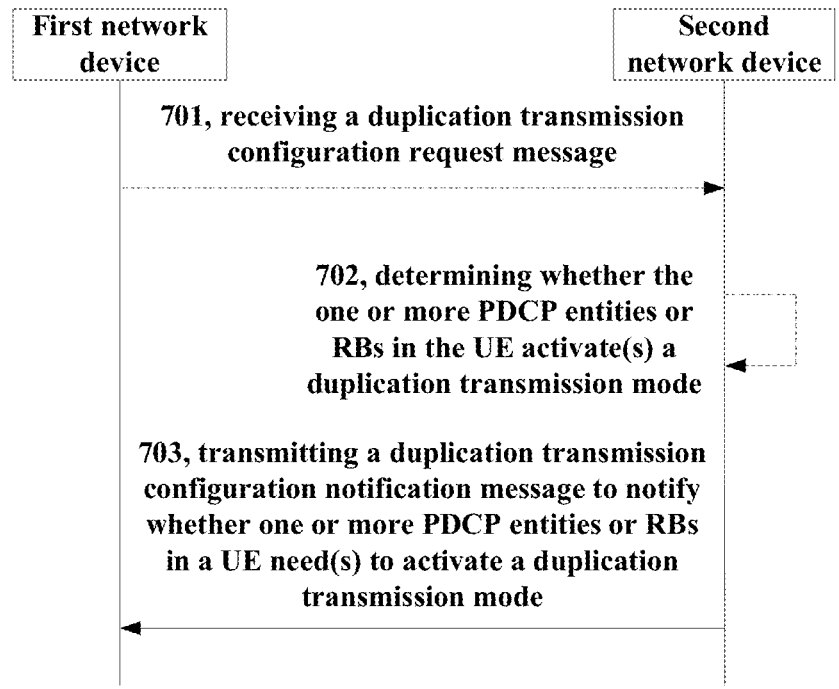
FIG. 7 is another schematic diagram of the information interaction method of Embodiment 3 of this disclosure.

FIG. 7 is another schematic diagram of the information interaction method of the embodiment of this disclosure, which shall be described from a plurality of network devices. As shown in FIG. 7, the information interaction method includes:

701: a second network device receives duplication transmission configuration request message(s) transmitted by one or more first network devices, the duplication transmission configuration request message(s) being used to indicate whether one or more PDCP entities or RBs in the UE need(s) to activate a duplication transmission mode.

In an embodiment, the duplication transmission configuration request message includes: an identity of the UE (such as a UE ID), identity/identities of one or more PDCP entities or identity/identities of one or more RBs, and indication information for activating or deactivating duplication transmission of the one or more PDCP entities or duplication transmission of the one or more RBs. However, this disclosure is not limited thereto, and for example, other information may also be included.

As shown in FIG. 7, the information interaction method may further include:

702: the second network device determines whether the PDCP entities or RBs activate(s) a duplication transmission mode.

For example, the second network device may, according to radio link quality and/or traffic features of the UE, determine whether the one or more PDCP entities or RBs perform(s) configuration of activation or deactivation of duplication transmission.

For another example, the second network device may, according to the duplication transmission configuration request message transmitted by one or more other network devices, determine whether the one or more PDCP entities or RBs perform(s) configuration of activation or deactivation of duplication transmission.

For a further example, the second network device may, according to some factors such as radio link quality and/or traffic features of the UE, and the duplication transmission configuration request message transmitted by one or more other network devices, determine whether the one or more PDCP entities or RBs perform(s) configuration of activation or deactivation of duplication transmission.

As shown in FIG. 7, the information interaction method may further include:

703: the second network device transmits a duplication transmission configuration notification message to one or more other network devices, for notifying the one or more network devices of whether the one or more PDCP entities or RBs in the user equipment activate(s) a duplication transmission mode.

For example, after the second network device makes a decision on performing configuration of activation or deactivation of duplication transmission on the one or more PDCP entities in the user equipment, it may transmit notification message for performing configuration of activation or deactivation of duplication transmission, notifying information on the decision it made to the first network device.

It should be noted that the embodiment of this disclosure is only illustrated in FIG. 7; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

It can be seen from the above embodiments that by transmitting a duplication transmission configuration notification message in network devices for indicating whether one or more PDCP entities or RBs in a user equipment need(s) to activate a duplication transmission mode, understanding of the configuration of the duplication transmission by a plurality of network devices may be ensured to be consistent.

Embodiment 4

The embodiments of this disclosure provide a command indication apparatus. The command indication apparatus may be, for example, a network device, or may be one or more parts or component in a network device. Contents in the embodiments identical to those in Embodiment 1 shall not be described herein any further.

Figure 8:
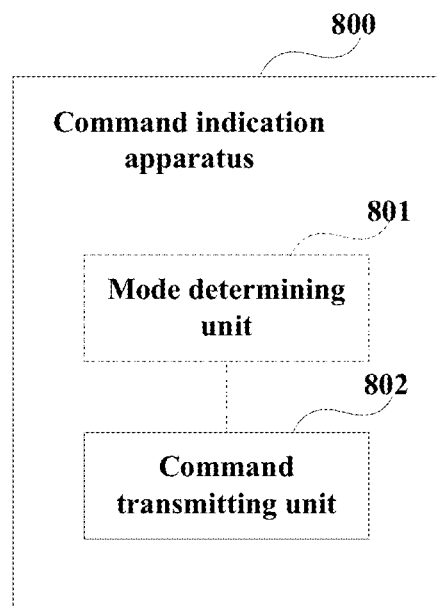
FIG. 8 is a schematic diagram of the command indication apparatus of Embodiment 4 of this disclosure.

FIG. 8 is a schematic diagram of the command indication apparatus of the embodiment of this disclosure. As shown in FIG. 8, a command indication apparatus 800 includes:

a command transmitting unit 802 configured to transmit to a user equipment (UE), a command for activating or deactivating duplication transmission by using a bitmap field, to activate or deactivate duplication transmission of one or more PDCP entities or RBs in the UE.

In an embodiment, one bit or a plurality of bits in the bitmap field correspond(s) to one of the PDCP entities or RBs.

For example, an i-th bit or an i-th pair of bits in the bitmap field correspond(s) to a PDCP entity of a DRB identity being i; or an i-th bit or an i-th pair of bits in the bitmap field correspond(s) to a PDCP entity of a duplication transmission identity being i.

For another example, an i-th bit or an i-th pair of bits in the bitmap field correspond(s) to an i-th PDCP entity in ranked PDCP entities in the UE that are configured as duplication transmission; wherein the PDCP entities that are configured as duplication transmission may be ranked in a sequential order of configuring duplication transmission by a network device, or, they may be ranked in a sequential order of DRB identities to which the PDCP entities correspond.

In an embodiment, a value of one bit or a plurality of bits in the bitmap field is used to indicate changing a duplication transmission state of the corresponding PDCP entity, and another value is used to indicate maintaining a duplication transmission state of the corresponding PDCP entity.

As shown in FIG. 8, the command indication apparatus 800 may further include:

a mode determining unit 801 configured to determine whether the one or more PDCP entities or RBs activate(s) a duplication transmission mode.

In an embodiment, the mode determining unit 801 may, according to radio link quality and/or traffic features of the UE, and/or the duplication transmission configuration request message transmitted by one or more network devices, determine whether the one or more PDCP entities or RBs perform(s) configuration of activation or deactivation of duplication transmission.

It should be noted that the components or modules related to this disclosure are only described above; however, this disclosure is not limited thereto. For example, the command indication apparatus 800 may further include other components or modules, and reference may be made to related techniques for particulars of these components or modules.

The embodiment of this disclosure further provides a command receiving apparatus. The command receiving apparatus may be, for example, a user equipment, or may be one or more parts or component in a user equipment.

Figure 9:
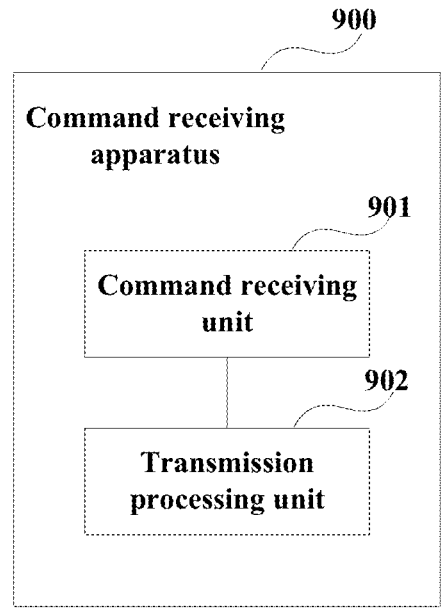
FIG. 9 is a schematic diagram of the command receiving apparatus of Embodiment 4 of this disclosure.

FIG. 9 is a schematic diagram of the command receiving apparatus of the embodiment of this disclosure. As shown in FIG. 9, a command receiving apparatus 900 includes:

a command receiving unit 901 configured to receive a command used for activating or deactivating duplication transmission transmitted by a network device via a bitmap field; and a transmission processing unit 902 configured to activate or deactivate duplication transmission of one or more packet data convergence protocol entities or radio bearers according to the bitmap field.

In an embodiment, one bit or a plurality of bits in the bitmap field is/are used to indicate that the corresponding PDCP entity executes one of the following operations: the duplication transmission of the PDCP entity being activated, and the PDCP entity simultaneously performing duplication transmission in a plurality of links; the duplication transmission of the PDCP entity being deactivated, and the PDCP entity simultaneously performing split transmission in a plurality of links; and the duplication transmission of the PDCP entity being deactivated, and the PDCP entity performing single-link transmission in a designated RLC entity (such as a first RLC entity or a second RLC entity).

It should be noted that the components or modules related to this disclosure are only described above; however, this disclosure is not limited thereto. For example, the command receiving apparatus 900 may further include other components or modules, and reference may be made to related techniques for particulars of these components or modules.

It can be seen from the above embodiments that by transmitting the command for activating or deactivating duplication transmission by the network device to the user equipment by using the bitmap field, duplication transmission of one or more PDCP entities or RBs in the UE may be activated or deactivated.

Embodiment 5

The embodiments of this disclosure provide an information interaction apparatus. The information interaction apparatus may be, for example, a network device, or may be one or more parts or component in a network device. Contents in the embodiments identical to those in Embodiment 2 shall not be described herein any further.

Figure 10:
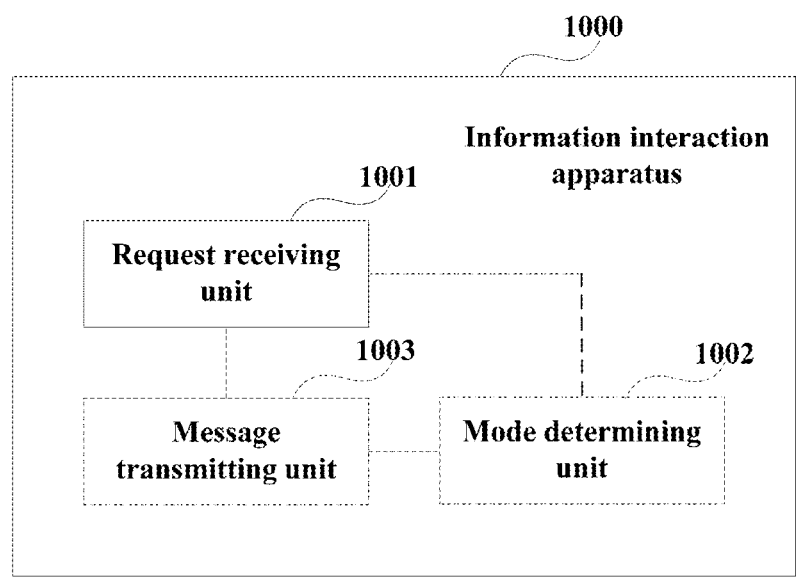
FIG. 10 is a schematic diagram of the information interaction apparatus of Embodiment 5 of this disclosure.

FIG. 10 is a schematic diagram of the information interaction apparatus of the embodiment of this disclosure. As shown in FIG. 10, an information interaction apparatus 1000 includes:

a request receiving unit 1001 configured to receive duplication transmission configuration request message(s) transmitted by one or more network devices, the duplication transmission configuration request message(s) being used to indicate whether one or more PDCP entities or radio bearers in a user equipment (UE) need(s) to activate a duplication transmission mode.

In an embodiment, the duplication transmission configuration request message may include: an identity of the UE, identity/identities of one or more PDCP entities or identity/identities of one or more RBs, and indication information for activating or deactivating duplication transmission of the one or more PDCP entities or RBs.

As shown in FIG. 10, the information interaction apparatus 1000 may further include:

a mode determining unit 1002 configured to, according to radio link quality and/or traffic features of the UE and/or the duplication transmission configuration request message(s) transmitted by the one or more network devices, determine whether the one or more PDCP entities or RBs activate(s) a duplication transmission mode.

As shown in FIG. 10, the information interaction apparatus 1000 includes:

a message transmitting unit 1003 configured to transmit duplication transmission configuration notification message(s) to the one or more network devices, for notifying the one or more network devices of whether one or more PDCP entities or RBs in a user equipment (UE) activate(s) a duplication transmission mode.

For example, the duplication transmission configuration notification message may include: an identity of the UE, identity/identities of one or more PDCP entities or identity/identities of one or more RBs, and indication information for activating or deactivating duplication transmission of the one or more PDCP entities or duplication transmission of the one or more RBs.

For another example, the duplication transmission configuration notification message may include: an identity of the UE, and a bitmap field for activating or deactivating duplication transmission of one or more PDCP entities or duplication transmission of one or more RBs.

It should be noted that the components or modules related to this disclosure are only described above; however, this disclosure is not limited thereto. For example, the information interaction apparatus 1000 may further include other components or modules, and reference may be made to related techniques for particulars of these components or modules.

It can be seen from the above embodiments that by transmitting a duplication transmission configuration notification message in network devices for indicating whether one or more PDCP entities or RBs in a user equipment need(s) to activate a duplication transmission mode, understanding of the configuration of the duplication transmission by a plurality of network devices may be ensured to be consistent.

Embodiment 6

The embodiments of this disclosure provide an information interaction apparatus. The information interaction apparatus may be, for example, a network device, or may be one or more parts or component in a network device. Contents in the embodiments identical to those in Embodiment 3 shall not be described herein any further.

Figure 11:
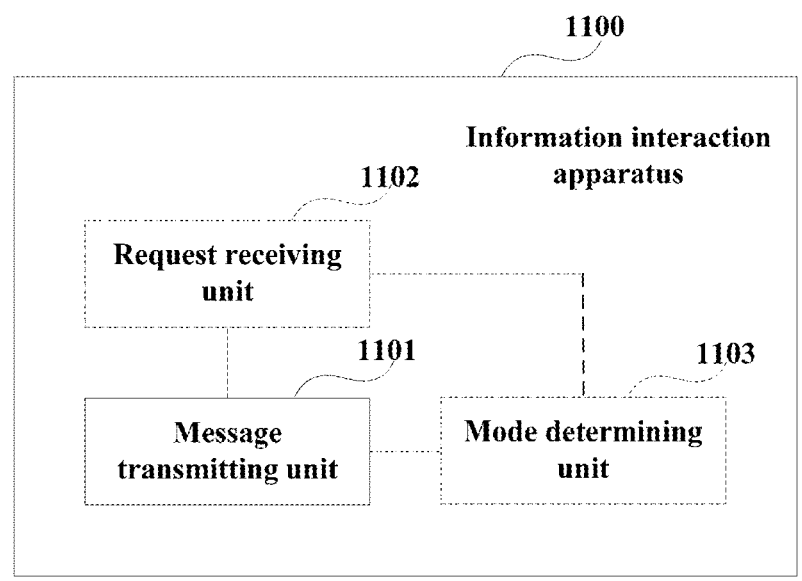
FIG. 11 is a schematic diagram of the information interaction apparatus of Embodiment 6 of this disclosure.

FIG. 11 is a schematic diagram of the information interaction apparatus of the embodiment of this disclosure. As shown in FIG. 11, an information interaction apparatus 1100 includes:

a message transmitting unit 1101 configured to transmit duplication transmission configuration notification message(s) to one or more network devices, for notifying the one or more network devices of whether one or more PDCP entities or RBs in a user equipment (UE) activate(s) a duplication transmission mode.

For example, the duplication transmission configuration notification message may include: an identity of the UE, identity/identities of one or more PDCP entities or identity/identities of one or more RBs, and indication information for activating or deactivating duplication transmission of the one or more PDCP entities or duplication transmission of the one or more RBs.

For another example, the duplication transmission configuration notification message may include: an identity of the UE, and a bitmap field for activating or deactivating duplication transmission of one or more PDCP entities or duplication transmission of one or more RBs.

As shown in FIG. 11, the information interaction apparatus 1100 may further include:

a request receiving unit 1102 configured to receive duplication transmission configuration request message(s) transmitted by one or more network devices, the duplication transmission configuration request message(s) being used to indicate whether one or more PDCP entities or RBs in the UE need(s) to activate a duplication transmission mode.

In an embodiment, the duplication transmission configuration request message may include: an identity of the UE, identity/identities of one or more PDCP entities or identity/identities of one or more RBs, and indication information for activating or deactivating duplication transmission of the one or more PDCP entities or duplication transmission of the one or more RBs.

As shown in FIG. 11, the information interaction apparatus 1100 may further include:

a mode determining unit 1103 configured to determine whether the one or more PDCP entities or radio bearers activate(s) a duplication transmission mode, according to radio link quality and/or traffic features of the UE and/or the duplication transmission configuration request message(s) transmitted by the one or more network devices.

It should be noted that the components or modules related to this disclosure are only described above; however, this disclosure is not limited thereto. For example, the information interaction apparatus 1100 may further include other components or modules, and reference may be made to related techniques for particulars of these components or modules.

It can be seen from the above embodiments that by transmitting a duplication transmission configuration notification message between the network devices for indicating whether one or more PDCP entities or RBs in a user equipment need(s) to activate a duplication transmission mode, understanding of the configuration of the duplication transmission by a plurality of network devices may be ensured to be consistent.

Embodiment 7

The embodiments of this disclosure provide a communication system, and reference may be made to FIG. 1, with contents identical to those in embodiments 1-6 being not going to be described herein any further. In the embodiments, the communication system 100 may further include:

a network device 101 configured with the information interaction apparatus 1000 as described in Embodiment 5 or the information interaction apparatus 1100 as described in Embodiment 6;

a network device 102 configured with the command indication apparatus 800 as described in Embodiment 4, or the information interaction apparatus 1000 as described in Embodiment 5, or the information interaction apparatus 1100 as described in Embodiment 6; and a user equipment 103 configured with the command indication apparatus 900 as described in Embodiment 4.

The embodiment of this disclosure further provides a network device, which may be, for example, a base station. However, this disclosure is not limited thereto, and it may also be another network device.

Figure 12:
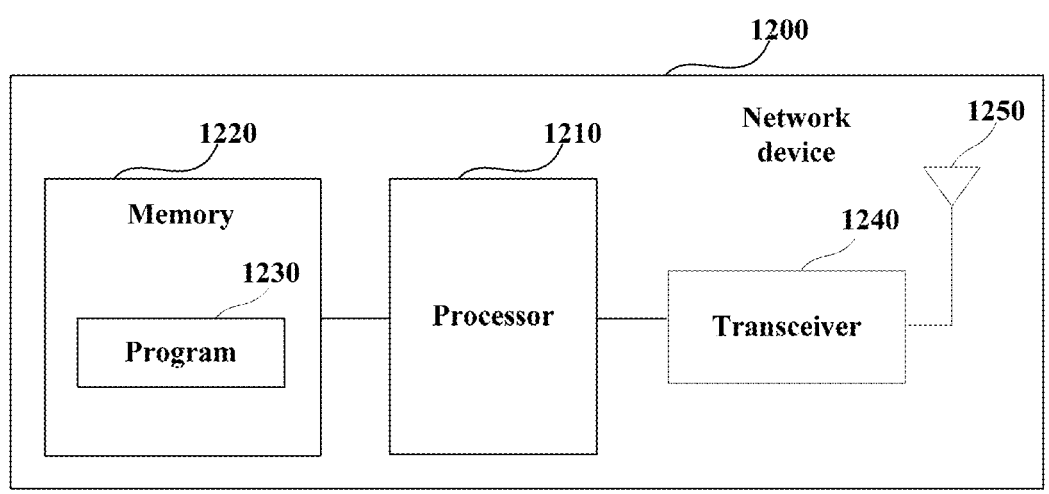
FIG. 12 is a schematic diagram of the network device of Embodiment 7 of this disclosure.

FIG. 12 is a schematic diagram of a structure of the network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

For example, the processor 1210 may be configured to execute the program 1230 to execute the following control: transmitting to a user equipment (UE), a command for activating or deactivating duplication transmission by using a bitmap field, to activate or deactivate duplication transmission of one or more PDCP entities or RBs in the UE.

Or, the processor 1210 may be configured to execute the program 1230 to execute the following control: receiving duplication transmission configuration request message(s) transmitted by one or more network devices, the duplication transmission configuration request message(s) being used to indicate whether one or more PDCP entities or RBs in a user equipment (UE) need(s) to activate a duplication transmission mode.

Or, the processor 1210 may be configured to execute the program 1230 to execute the following control: transmitting duplication transmission configuration request message(s) to one or more network devices, the duplication transmission configuration request message(s) being configured to indicate whether one or more PDCP entities or RBs in a user equipment (UE) need(s) to activate a duplication transmission mode.

Or, the processor 1210 may be configured to execute the program 1230 to execute the following control: transmitting duplication transmission configuration notification message(s) for notifying one or more network devices of whether one or more PDCP entities or RBs in a user equipment (UE) activate(s) a duplication transmission mode.

Or, the processor 1210 may be configured to execute the program 1230 to execute the following control: receiving duplication transmission configuration notification message(s) transmitted by one or more network devices, for notifying the one or more network devices of whether one or more PDCP entities or RBs in a user equipment (UE) activate(s) a duplication transmission mode.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

The embodiment of this disclosure further provides a user equipment, however, this disclosure is not limited thereto, and it may also be another equipment.

Figure 13:
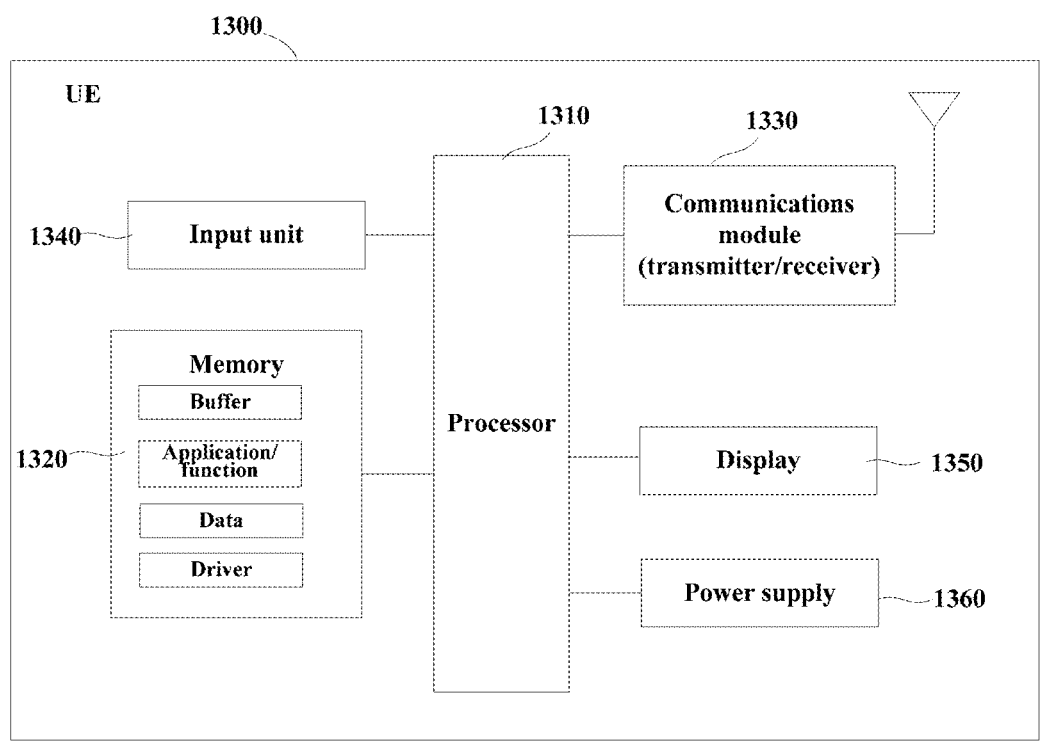
FIG. 13 is a schematic diagram of the user equipment of Embodiment 7 of this disclosure.

FIG. 13 is a schematic diagram of the user equipment of the embodiment of this disclosure. As shown in FIG. 13, a user equipment 1300 may include a processor 1310 and a memory 1320, the memory 1320 storing data and a program and being coupled to the processor 1310. It should be noted that his figure is illustrative only, and other types of structures may also be used, so as to supplement or replace this structure and achieve a telecommunications function or other functions.

For example, the processor 1310 may be configured to execute the following control: receiving a command used for activating or deactivating duplication transmission transmitted by a network device via a bitmap field; and activating or deactivating duplication transmission of one or more PDCP entities or RBs according to the bitmap field.

As shown in FIG. 13, the user equipment 1300 may further include a communication module 1330, an input unit 1340, a display 1350, and a power supply 1360; functions of the above components are similar to those in the relevant art, which shall not be described herein any further. It should be noted that the user equipment 1300 does not necessarily include all the parts shown in FIG. 13, and the above components are not necessary. Furthermore, the user equipment 1300 may include parts not shown in FIG. 13, and the relevant art may be referred to.

An embodiment of the present disclosure provides a computer readable program code, which, when executed in a network device, will cause the network device to carry out the command indication method or the information interaction method as described in embodiments 1-3.

An embodiment of the present disclosure provides a computer storage medium, including a computer readable program code, which will cause a network device to carry out the command indication method or the information interaction method as described in embodiments 1-3.

An embodiment of the present disclosure provides a computer readable program code, which, when executed in a user equipment, will cause the user equipment to carry out the command receiving method as described in Embodiment 1.

An embodiment of the present disclosure provides a computer storage medium, including a computer readable program code, which will cause a user equipment to carry out the command receiving method as described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 8 (such as the mode determining unit and the command transmitting unit) may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further provided in this disclosure.

Supplement 1. A command indication method, including: transmitting a command for activating or deactivating duplication transmission by a network device to a user equipment by using a bitmap field, to activate or deactivate duplication transmission of one or more packet data convergence protocol entities or radio bearers in the UE.

Supplement 2. The command indication method according to supplement 1, wherein one bit or a plurality of bits in the bitmap field correspond(s) to one of the packet data convergence protocol entities or radio bearers.

Supplement 3. The command indication method according to supplement 2, wherein an i-th bit or an i-th pair of bits in the bitmap field correspond(s) to a packet data convergence protocol entity of a data radio bearer identity being i; or an i-th bit or an i-th pair of bits in the bitmap field correspond(s) to a packet data convergence protocol entity of a duplication transmission identity being i.

Supplement 4. The command indication method according to supplement 2, wherein an i-th bit or an i-th pair of bits in the bitmap field correspond(s) to an i-th packet data convergence protocol entity in ranked packet data convergence protocol entities in the UE that are configured as duplication transmission.

Supplement 5. The command indication method according to supplement 4, wherein the packet data convergence protocol entities that are configured as duplication transmission are ranked in a sequential order of configuring duplication transmission by a network device, or are ranked in a sequential order of corresponding data radio bearer identities.

Supplement 6. The command indication method according to supplement 2, wherein a value of one bit or a plurality of bits in the bitmap field is used to indicate changing a duplication transmission state of the corresponding packet data convergence protocol entity, and another value is used to indicate maintaining a duplication transmission state of the corresponding packet data convergence protocol entity.

Supplement 7. The command indication method according to supplement 2, wherein one bit or a plurality of bits in the bitmap field is/are used to indicate that the corresponding packet data convergence protocol entity executes one of the following operations:

the duplication transmission of the packet data convergence protocol entity being activated, and the packet data convergence protocol entity simultaneously performing duplication transmission in a plurality of links;

the duplication transmission of the packet data convergence protocol entity being deactivated, and the packet data convergence protocol entity simultaneously performing split transmission in a plurality of links; and the duplication transmission of the packet data convergence protocol entity being deactivated, and the packet data convergence protocol entity performing single-link transmission in a designated radio link control entity.

Supplement 8. The command indication method according to supplement 1, wherein the command indication method further includes:

according to radio link quality and/or traffic features of the UE and/or duplication transmission configuration notification message(s) transmitted by one or more network devices, determining whether the one or more packet data convergence protocol entities or radio bearers activate(s) a duplication transmission mode.

Supplement 9. An information interaction method, including:

receiving, by a network device, duplication transmission configuration request message(s) transmitted by one or more network devices, the duplication transmission configuration request message(s) being used to indicate whether one or more packet data convergence protocol entities or radio bearers in a user equipment (UE) need(s) to activate a duplication transmission mode.

Supplement 10. The information interaction method according to supplement 9, wherein the duplication transmission configuration request message includes: an identity of the UE, identity/identities of one or more packet data convergence protocol entities or identity/identities of one or more radio bearers, and indication information for activating or deactivating duplication transmission of the one or more packet data convergence protocol entities or radio bearers.

Supplement 11. The information interaction method according to supplement 9, wherein the information interaction method further includes:

according to radio link quality and/or traffic features of the UE and/or the duplication transmission configuration request message(s) transmitted by the one or more network devices, determining whether the one or more packet data convergence protocol entities or radio bearers activate(s) a duplication transmission mode.

Supplement 12. The information interaction method according to supplement 11, wherein the information interaction method further includes:

transmitting duplication transmission configuration notification message(s) by the network device to one or more other network devices, for notifying the one or more network devices of whether the one or more packet data convergence protocol entities or radio bearers in the UE activate(s) a duplication transmission mode.

Supplement 13. The information interaction method according to supplement 12, wherein the duplication transmission configuration notification message includes: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

Supplement 14. The information interaction method according to supplement 12, wherein the duplication transmission configuration notification message includes: an identity of the UE, and a bitmap field for activating or deactivating duplication transmission of one or more packet data convergence protocol entities or duplication transmission of one or more radio bearers.

Supplement 15. An information interaction method, including:

transmitting duplication transmission configuration notification message(s) by a network device to one or more other network devices, for notifying the one or more network devices of whether one or more packet data convergence protocol entities or radio bearers in a user equipment (UE) activate(s) a duplication transmission mode.

Supplement 16. The information interaction method according to supplement 15, wherein the duplication transmission configuration notification message includes: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

Supplement 17. The information interaction method according to supplement 15, wherein the duplication transmission configuration notification message includes: an identity of the UE, and a bitmap field for activating or deactivating duplication transmission of one or more packet data convergence protocol entities or duplication transmission of one or more radio bearers.

Supplement 18. The information interaction method according to supplement 15, wherein the information interaction method further includes:

determining whether the one or more packet data convergence protocol entities or radio bearers activate(s) a duplication transmission mode, according to radio link quality and/or traffic features of the UE and/or the duplication transmission configuration request message(s) transmitted by the one or more network devices.

Supplement 19. The information interaction method according to supplement 18, wherein the information interaction method further includes:

receiving, by the network device, duplication transmission configuration request message(s) transmitted by one or more other network devices, the duplication transmission configuration request message(s) being used to indicate whether one or more packet data convergence protocol entities or radio bearers in the UE need(s) to activate a duplication transmission mode.

Supplement 20. The information interaction method according to supplement 19, wherein the duplication transmission configuration request message includes: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

Supplement 21. A command indication method, including:
transmitting a command for activating or deactivating duplication transmission by a network device to a user equipment, the command instructing the user equipment to execute one of the following operations:
the duplication transmission of the packet data convergence protocol entity being activated, and the packet data convergence protocol entity simultaneously performing duplication transmission in a plurality of links;
the duplication transmission of the packet data convergence protocol entity being deactivated, and the packet data convergence protocol entity simultaneously performing split transmission in a plurality of links;
the duplication transmission of the packet data convergence protocol entity being deactivated, and the packet data convergence protocol entity performing single-link transmission in a first radio link control entity; and
the duplication transmission of the packet data convergence protocol entity being deactivated, and the packet data convergence protocol entity performing single-link transmission in a second radio link control entity.

Supplement 22. A configuration method, including:
transmitting a configuration command by a network device to a user equipment, the configuration command instructing the user equipment to execute one of the following operations:
an initial transmission state of a packet data convergence protocol entity being a deactivated state of duplication transmission, and the packet data convergence protocol entity simultaneously performing split transmission in a plurality of links;
an initial transmission state of a packet data convergence protocol entity being a deactivated state of duplication transmission, and the packet data convergence protocol entity performing single-link transmission in a first radio control link;
an initial transmission state of a packet data convergence protocol entity being a deactivated state of duplication transmission, and the packet data convergence protocol entity performing single-link transmission in a second radio control link.

Supplement 23. A command receiving method, including:
receiving, by a user equipment, a command used for activating or deactivating duplication transmission transmitted by a network device via a bitmap field; and
activating or deactivating duplication transmission of one or more packet data convergence protocol entities or radio bearers by the UE according to the bitmap field.

Supplement 24. A network device, including a processor and a memory coupled to the processor,
the processor being configured to carry out the methods as described in supplements 1-22.

Supplement 25. A user equipment, including a processor and a memory coupled to the processor,
the processor being configured to carry out the method as described in supplement 23.

Supplement 26. A communication system, including the network device as described in supplement 24 and/or the user equipment as described in supplement 25.

What is claimed is:

1. An information interaction apparatus configured in a second network device, comprising:
   a memory that stores a plurality of instructions; and
   a processor coupled to the memory and configured to execute the instructions to:
   receive duplication transmission configuration request message(s) transmitted by one or more first network devices, the duplication transmission configuration request message(s) being used to indicate whether one or more packet data convergence protocol entities or radio bearers in a user equipment (UE) need(s) to activate a duplication transmission mode,
   wherein the duplication transmission configuration request message comprises: identity/identities of one or more radio bearers and indication information for activating or deactivating duplication transmission of the one or more packet data convergence protocol entities or radio bearers,
   wherein the duplication transmission configuration request message further comprises: and identity of the UE.

2. The information interaction apparatus according to claim 1, wherein the duplication transmission configuration request message further comprises: identity/identities of one or more packet data convergence protocol entities.

3. The information interaction apparatus according to claim 1, wherein the processor further configured to, according to radio link quality and/or traffic features of the UE and/or the duplication transmission configuration request message(s) transmitted by the one or more first network devices, determine whether the one or more packet data convergence protocol entities or radio bearers activate(s) a duplication transmission mode.

4. The information interaction apparatus according to claim 3, wherein the processor further configured to transmit duplication transmission configuration notification message(s) to one or more first network devices, for notifying the one or more first network devices of whether the one or more packet data convergence protocol entities or radio bearers in the UE activate(s) a duplication transmission mode.

5. The information interaction apparatus according to claim 4, wherein the duplication transmission configuration notification message comprises: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

6. The information interaction apparatus according to claim 4, wherein the duplication transmission configuration notification message comprises: an identity of the UE, and a bitmap field for activating or deactivating duplication transmission of one or more packet data convergence protocol entities or duplication transmission of one or more radio bearers.

7. An information interaction apparatus configured in a second network device, comprising:
a memory that stores a plurality of instructions; and
a processor coupled to the memory and configured to execute the instructions to:
transmit duplication transmission configuration notification message(s) to one or more network first devices, for notifying the one or more first network devices of whether one or more packet data convergence protocol entities or radio bearers in a user equipment (UE) activate(s) a duplication transmission mode.

8. The information interaction apparatus according to claim 7, wherein the duplication transmission configuration notification message comprises: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

9. The information interaction apparatus according to claim 7, wherein the duplication transmission configuration notification message comprises: an identity of the UE, and a bitmap field for activating or deactivating duplication transmission of one or more packet data convergence protocol entities or duplication transmission of one or more radio bearers.

10. The information interaction apparatus according to claim 7, wherein the processor further configured to determine whether the one or more packet data convergence protocol entities or radio bearers activate(s) a duplication transmission mode, according to radio link quality and/or traffic features of the UE and/or the duplication transmission configuration request message(s) transmitted by the one or more first network devices.

11. The information interaction apparatus according to claim 10, wherein the processor further configured to receive duplication transmission configuration request message(s) transmitted by one or more first network devices, the duplication transmission configuration request message(s) being used to indicate whether one or more packet data convergence protocol entities or radio bearers in the UE need(s) to activate a duplication transmission mode.

12. The information interaction apparatus according to claim 11, wherein the duplication transmission configuration request message comprises: an identity of the UE, identity/identities of one or more packet data convergence protocol entities or identity/identities of one or more radio bearers, and indication information for activating or deactivating duplication transmission of the one or more packet data convergence protocol entities or duplication transmission of the one or more radio bearers.

* * * * *